US011922214B2

(12) United States Patent
Osmond et al.

(10) Patent No.: US 11,922,214 B2
(45) Date of Patent: *Mar. 5, 2024

(54) BROWSER-BASED PROCESSING OF DATA (71) Applicant: The Toronto-Dominion Bank, Toronto (CA)

(72) Inventors: Walter Osmond, Toronto (CA); Osama Syed Hashimi, Oakville (CA); Ivan Shibanov, Toronto (CA)

(73) Assignee: The Toronto-Dominion Bank

( * ) Notice: Subject to any disclaimer, the term of this patent is extended or adjusted under 35 U.S.C. 154(b) by 0 days.

This patent is subject to a terminal disclaimer.

(21) Appl. No.: 17/659,210

(22) Filed: Apr. 14, 2022

(65) Prior Publication Data
US 2022/0237030 A1 Jul. 28, 2022

Related U.S. Application Data (63) Continuation of application No. 16/801,411, filed on Feb. 26, 2020, now Pat. No. 11,334,385.

(51) Int. Cl.
*G06F 9/48* (2006.01)
*G06F 9/451* (2018.01)

(52) U.S. Cl.
CPC ............ *G06F 9/4881* (2013.01); *G06F 9/451* (2018.02)

(58) Field of Classification Search
CPC .......... G06F 9/4881; G06F 9/451; G06F 2209/5018; G06F 9/5061; G06F 9/547; G06F 2209/541; G06F 2209/545; G06F 9/541
See application file for complete search history.

(56) References Cited

U.S. PATENT DOCUMENTS

| | | | |
|---|---|---|---|
| 6,665,704 B1 * | 12/2003 | Singh | H04L 67/568 719/330 |
| 7,565,543 B1 | 7/2009 | Mungale | |
| 8,954,589 B2 | 2/2015 | Fisher et al. | |
| 11,334,385 B2 | 5/2022 | Osmond et al. | |
| 2007/0067305 A1 | 3/2007 | Ives | |

(Continued)

OTHER PUBLICATIONS

Non-Final Office Action issued in U.S. Appl. No. 16/801,411 dated Sep. 16, 2021, 22 pages.

(Continued)

*Primary Examiner* — Jorge A Chu Joy-Davila
(74) *Attorney, Agent, or Firm* — Fish & Richardson P.C.

(57) ABSTRACT

In some implementations, a user interface for an application is displayed using a web browser instance on a client device. An input is received to present data on the user interface in a particular view. In response to the input, a first web worker thread corresponding to the web browser instance obtains data from a server, and executes first library routines to store the data in local storage at the client device. A second web worker thread, which corresponds to the web browser instance and the user interface, accesses the data from the local storage by using one or more second library routines, and processes the data to convert to a presentation format corresponding to the particular view. The second web worker thread stores the processed data in the local storage by using one or more third library routines, and provides the processed data for display on the user interface.

21 Claims, 4 Drawing Sheets

(56) References Cited

U.S. PATENT DOCUMENTS

| | | | |
|---|---|---|---|
| 2007/0294627 A1* | 12/2007 | Sauve | G06F 3/0483 |
| | | | 715/764 |
| 2010/0306066 A1* | 12/2010 | Binnewies | G06Q 30/0277 |
| | | | 705/14.73 |
| 2013/0339485 A1 | 12/2013 | Sen | |
| 2014/0143648 A1 | 5/2014 | Kolesnikov | |
| 2015/0095838 A1 | 4/2015 | Rossi et al. | |
| 2017/0006128 A1 | 1/2017 | Raham-Cumming et al. | |
| 2017/0132978 A1* | 5/2017 | Fu | G09G 3/2025 |
| 2017/0205788 A1 | 7/2017 | Lee et al. | |
| 2017/0237619 A1* | 8/2017 | Flynn | H04L 41/0843 |
| | | | 709/221 |
| 2017/0357437 A1 | 12/2017 | Peterson et al. | |
| 2020/0058273 A1* | 2/2020 | McCallum | G09G 5/393 |

OTHER PUBLICATIONS

Office Action in Canada Appln. No. 3,073,712, dated Oct. 3, 2023, 9 pages.

\* cited by examiner

BROWSER-BASED PROCESSING OF DATA

CROSS-REFERENCE TO RELATED PATENT APPLICATIONS

This application is a continuation of and claims the benefit of priority to U.S. patent application Ser. No. 16/801,411, filed Feb. 26, 2022, the contents of which are incorporated by reference herein

TECHNICAL FIELD

The present disclosure relates to computer-implemented methods, software, and systems for browser-based processing of data on a device.

BACKGROUND

Organizations that process with large volumes of data often use application platforms to process the data for decision making purposes. In some cases, such an application platform renders, on a user interface (UI) displayed on a computing device, a large volume of data, for example, in the order of millions of data records, some or all of which can be streamed in real-time from a server.

SUMMARY

The present disclosure involves systems, software, and computer-implemented methods related to an application platform that uses a web browser for processing data, performing complex operations on the data and enabling rendering of the data on a device UI using web worker threads, without encountering thread blockages due to attendant processor-intensive operations. The application platform relies on a suite of pre-built software libraries (IndexedDB (IDB) libraries) for communication between the web worker threads and storage for data processing. The application platform uses web worker threads to fetch data from remote servers and store in local device storage, and to perform data aggregations and calculations on the locally stored data, with the web worker threads using IndexedDB (IDB) application programming interface (API) calls to access the data from local storage. In some implementations, the application platform is a financial trading platform and the data includes large volumes of trading data, for example, risk and/or profit-loss data, which are exchanged between a server and a client device. One example method includes: displaying, using a web browser instance on a client device, a first user interface for an application; receiving an input to present data on the first user interface in a particular view; in response to the input, obtaining, using a first web worker thread corresponding to the web browser instance, data from a server that is communicably coupled to the client device; executing, using the first web worker thread, one or more first library routines to store the data in local storage at the client device; accessing, by a second web worker thread using one or more second library routines, the data from the local storage, where the second web worker thread corresponds to the web browser instance and the first user interface; processing, by the second web worker thread, the data to convert to a presentation format corresponding to the particular view; storing, by the second web worker thread using one or more third library routines, the processed data in the local storage; and providing, by the second web worker thread, the processed data for display on the first user interface.

Implementations can optionally include one or more of the following features. In some implementations, the method further comprises: displaying, using a second web browser instance on the client device, a second user interface for the application; receiving a second input to present data on the second user interface in a second view; in response to the second input, accessing, by a third web worker thread using the one or more second library routines, second data from the local storage, where the third web worker thread corresponds to the second web browser instance and the second user interface; processing, by the third web worker thread, the second data to convert to a second presentation format corresponding to the second view; providing, by the third web worker thread, the processed second data for display on the second user interface; and storing, by the third web worker thread using one or more third library routines, the processed second data in the local storage.

In some implementations, receiving the second input to present data on the second user interface in the second view further comprises: obtaining, in response to the second input and using the first web worker thread, the second data from the server; and executing, using the first web worker thread, the one or more first library routines to store the second data in the local storage at the client device.

In some implementations, at least a portion of the second data is same as the data processed by the first web worker thread. In some implementations, the web browser instance and the second web browser instance are instances of a same web browser executed on the client device. In some implementations, displaying the second user interface comprises: displaying the second user interface concurrently with displaying the first user interface.

In some implementations, the method further comprises: obtaining, using the first web worker thread, additional data from the server; executing, using the first web worker thread, the one or more first library routines to store the additional data in the local storage at the client device; and causing at least one of the second web worker thread or the third web worker thread to access the additional data from the local storage for processing. In some implementations, obtaining the additional data from the server comprises: obtaining first additional data corresponding to the first user interface; and obtaining second additional data corresponding to the second user interface, where at least a portion of the second additional data is distinct from the first additional data.

In some implementations, the local storage includes an IndexedDB datastore, and where at least one of the first library routines, the second library routines, or the third library routines includes an IndexedDB Promised Library routine. In some implementations, the data obtained from the server includes Real-time Rendering Engine (RTRE) data and the processed data includes crunched data, and where processing the data by the second web worker thread comprises: aggregating, using the second web worker thread, the RTRE data accessed from the local storage to a crunched presentation format corresponding to the particular view.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

Like reference numbers in various figures indicate like elements.

DETAILED DESCRIPTION

Organizations that process with large volumes of data often use application platforms to visualize the data and use such visualizations for decision making purposes. For example, a financial organization that deals with equities and derivatives, such as an investment bank, can use trading application platforms to make buy and sell decisions. A trading application platform (also referred to interchangeably as a "trading platform") uses a client-server system architecture, executing processes on one or more client devices and one or more servers, facilitating exchange of trading data (e.g., risk and/or profit-loss data) between the components of the system. One of the features of the trading platform is to render, using UIs presented on client device displays, large volumes of trading data, for example, in the order of millions of data records. The trading data can include, for example, aggregation of equities and derivatives data from the trading markets, based on books of data that traders want to see. The trading data can include data streamed in real-time from servers. In some implementations, the UI is a text-based UI, while in some other implementations, the UI is a graphical UI (GUI) presented using a browser application executed by the client device (also referred to as a "client UI" or "client device UI"). Equities and derivatives traders use the data, to make informed investment decisions. As another example, a survey organization can use a statistical analysis platform to process large volumes of polling data, in a manner similar to the above.

The following sections describe the disclosed systems, software, and computer implemented methods with respect to a trading application platform, without loss of generality. However, the disclosed systems, software, and computer implemented methods are also applicable to other types of application platforms.

The processing of the trading data is conventionally performed using backend processes, for example, Java Virtual Machines (JVMs) running in the backend, in communication with servers. Such processing, however, does not scale well to handle large volumes of data that may be required to be displayed using multiple views, which can be based on topics such as trades, or quotes, among others. As different traders log in to a client device, for example using multiple different monitors that are coupled to the same client device computing unit, and seek different views of large amounts of data, the amount of computational resources required for such processing can quickly exceed the capabilities of the JVMs, leading to sluggish performance.

The present disclosure describes various techniques related to a trading platform that addresses the performance issues faced by conventional approaches. The disclosed techniques realize a trading platform that uses a web browser for processing trading data, performing complex operations on the data and enabling rendering of the data using a GUI displayed on a client device using web worker threads, without encountering thread blockages due to attendant processor-intensive operations. To access trading data stored in local storage in the client device, the trading platform relies on a suite of pre-built IDB software libraries for communication between the web worker threads and the storage. The software libraries include low level IDB API calls to access the data, which are used by the web worker threads to manage the frequency of database calls (data throttling), and queuing data for processing, among others. In some implementations, the trading platform is run entirely in a runtime processing environment of the web browser.

In this context, a web worker thread refers to a computational process that is executed from a UI application, such as a browser application, and that runs in the background independently of user-interface scripts that may also have been executed from the same UI application. For example, in some cases, a web worker thread is a JavaScript script executed from a HTML page that runs in the background independently of user-interface scripts (for example, scripts that respond to clicks or other user interactions) that are also executed from the same HTML page. Web worker threads are often able to utilize multi-core processors or central processing units (CPUs) more effectively. In some cases, a web worker thread is a long-running script that is not interrupted by user-interface scripts responding to user activities. Accordingly, a web worker thread can be used to perform a computationally expensive task without interrupting the user interface. In some cases, a web worker thread can be used for data caching, for example, to load and store data.

As described in greater detail below, in some implementations, a trading platform presents a GUI using a browser application on a client device, and executes one or more web worker threads as background processes of the browser application to remain responsive in real-time for display of trading data, while running complex operations in the background, using IDB software routines to process the trading data in the client device.

In the following sections, references to a trading platform are meant to include a browser application that is used by the trading platform to present a corresponding trading platform UI. The web worker threads, which are executed within a processing environment of the browser application, are managed by the trading platform.

The disclosed techniques enable a client device to render real-time streaming data on a trading platform UI displayed on the device, concurrently with performing complex operations on the data and display of corresponding analytics, while avoiding (i) display stalling due to CPU-intensive complex operations, and (ii) sluggishness in data refresh due to round-trip time delay in fetching trading data from remote servers. In doing so, the performance bottleneck issues that are encountered with the conventional approaches are avoided. The disclosed techniques allow the trading platform to remain promptly responsive to user inputs, which can facilitate accurate and/or effective decision making by the users of the data. The disclosed trading platform is also robust to scalability. As more users (for example, derivatives and equities traders) run the trading platform, new web worker threads are spawned, causing more bandwidth to be available for processing. Additionally or alternatively, implementing the trading platform in a web browser runtime environment creates a highly portable solution that is independent of the underlying characteristics of the client device.

In some implementations of the present solution, the trading platform processes trading data by executing different types of web worker threads, which include data worker threads and crunch worker threads. A data worker thread is a web worker thread that is tasked with fetching data from one or more servers and maintaining real-time, or non-real-time data subscriptions. In some implementations, a data worker thread is subscribed to several streams of data and events using a streaming API, for example, a GraphQL subscription API. The data worker thread stores data received from the servers in local storage in the client device. In some implementations the local storage includes IndexedDB datastores, and the data worker thread relies on IDB libraries for storing data in the IndexedDB datastores. In some implementations, the data obtained from the servers are raw data, which are stored as raw RTRE data.

A crunch worker thread is a web worker thread that is specific for a particular job, and tasked with performing aggregation and computation operations on the trading data for the assigned job. In this context, a job refers to a series of related tasks that are performed to process and prepare raw trading data for presentation in a particular format, for example, as requested by a user of the trading platform. The trading platform uses crunch worker threads for complex event processing on rapidly changing data. In some implementations, a crunch worker thread accesses data from the IndexedDB datastores using IDB libraries. The data processed by a crunch worker thread is stored in the IndexedDB datastores as crunched data. In some implementations, aggregation tasks performed by crunch worker threads are triggered upon receiving data updates from the backend servers. In such implementations, receiving data update events prompt the IDB libraries to trigger the crunch worker threads to access the raw data from the IndexedDB datastores for processing. In some cases, the IDB libraries are promise-driven libraries, such that the operational flow of the trading platform depends on when tasks are completed.

In some implementations, the trading platform executes multiple instances of data and/or crunch worker threads, depending on the requirements of the application. For example, as more users access the trading platform on one or more client devices, starting new browser instances and/or tabs in existing browser instances, more resources (for example, more web worker threads) are made available to spread out the tasks in the web browser runtime environment. In this manner, the processing load of the trading platform is decentralized through the users.

Figure 1A:
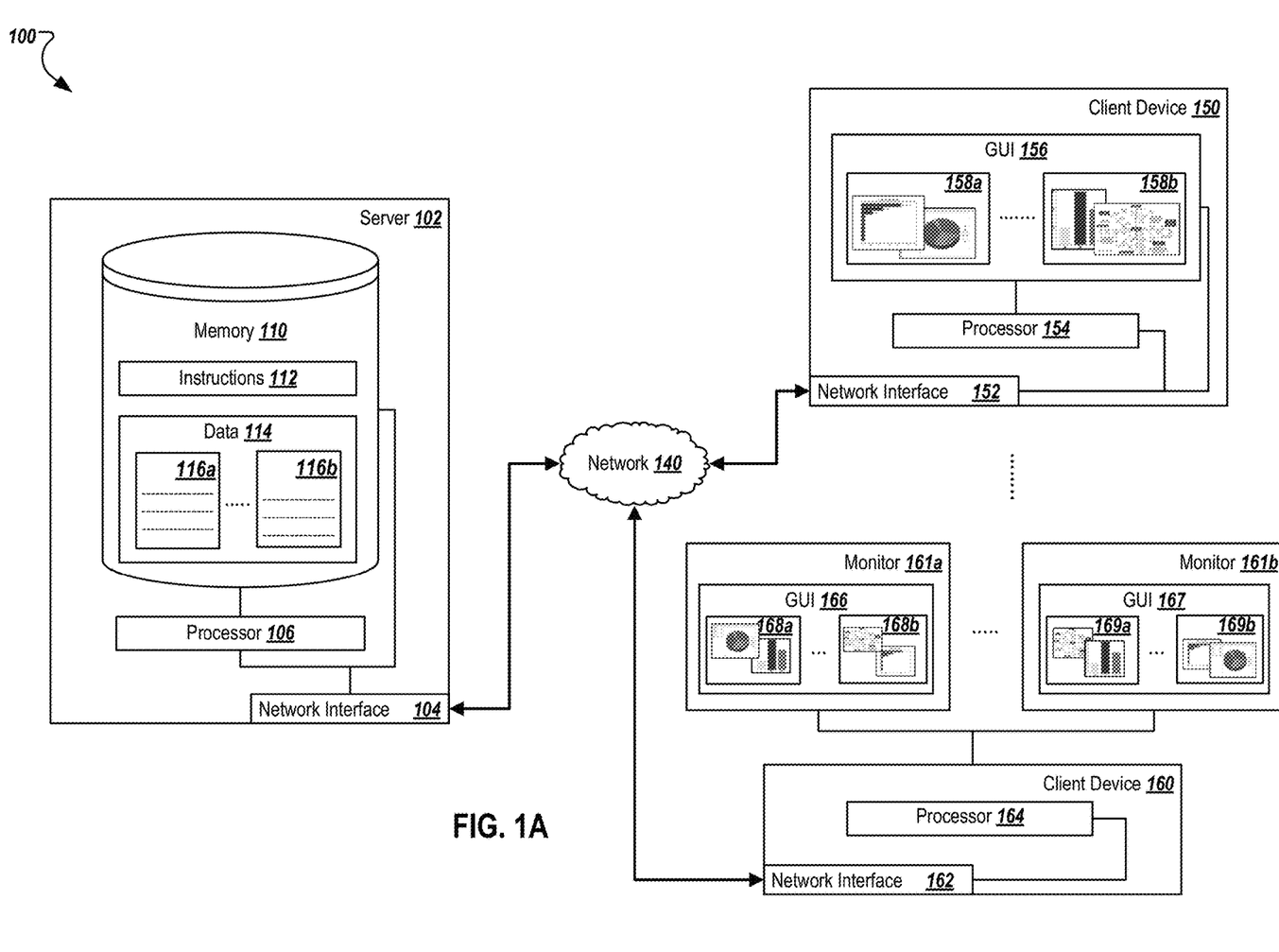
FIGS. 1A and 1B show block diagrams of, respectively, an example system for browser-based processing of application data and a detailed view of web worker threads used for processing application data in a client device in the system.
Figure 1B:
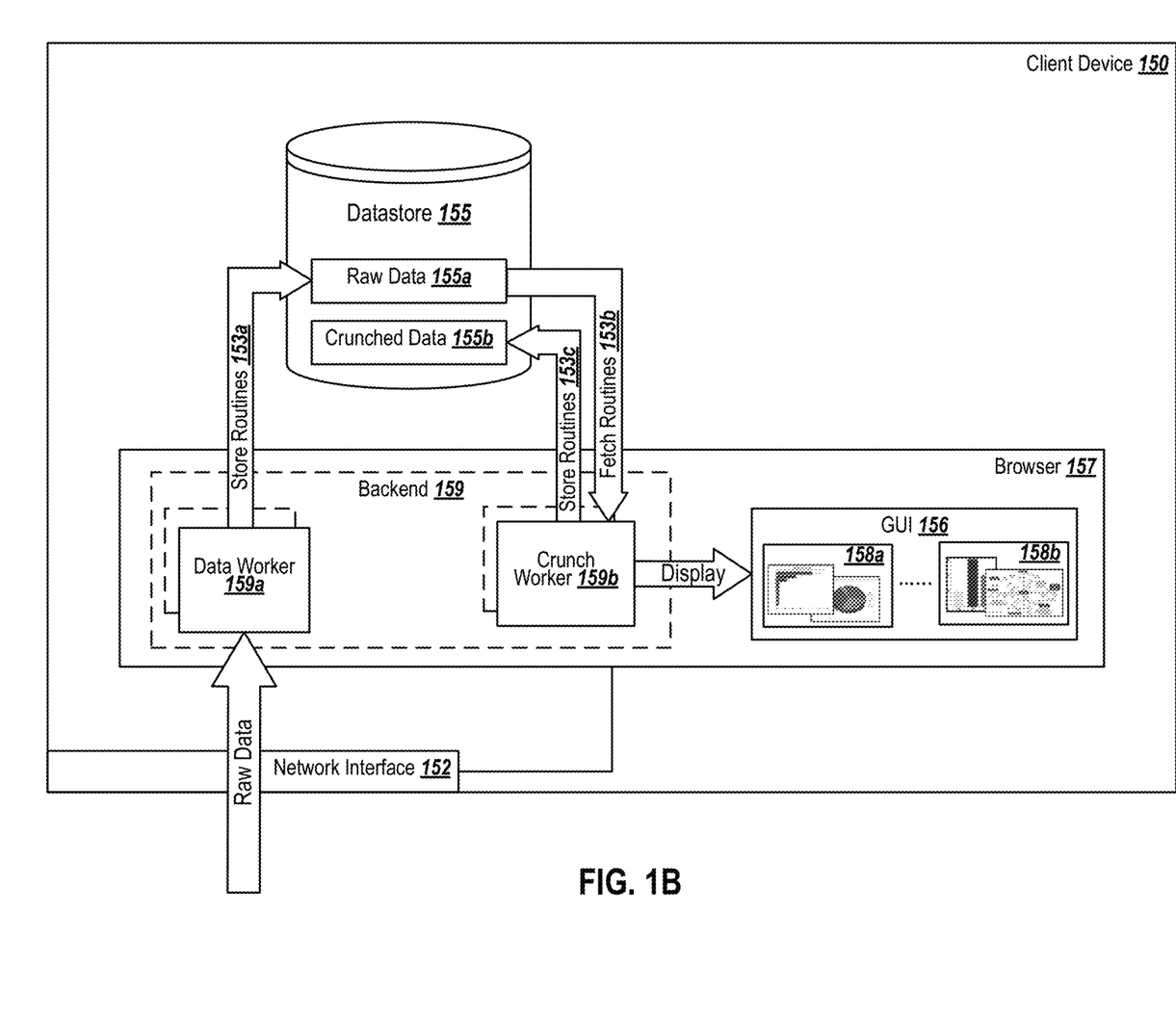

Turning to the illustrated example implementation, FIGS. 1A and 1B show block diagrams of, respectively, an example system 100 for browser-based processing of application data and a detailed view of web worker threads used for processing application data in a client device in the system 100. As shown in FIG. 1A, the system 100 includes server 102, and client devices 150 and 160 that are communicably coupled to the server 102 through a network 140. Although FIG. 1A illustrates two client devices 150 and 160, the system 100 can be implemented using a single client device (for example, one of client device 150 or client device 160), or more than the two client devices that are shown.

In some implementations, the server 102 and the client devices 150 and 160 are associated with (for example, owned or used by) the same organization, and collaborate to process and display, using application platforms running on the client devices, large volumes of data of interest to the organization. For example, in some cases, the organization is a bank or other financial institution. The server 102 obtains and stores trading data, such as risk and/or profit-loss data, from various different data providers, and provides APIs for the client devices to connect to the server to obtain the trading data. The server 102 operates as a pass through, to send trading data to individual web browsers on client devices for processing by web worker threads. A trading platform running on the client device 150 and/or the client device 160 obtains the trading data from the server 102 using the APIs, and presents the data on a user interface of the trading platform displayed on the respective client device. The trading data presented can be in large volumes, for example, millions of records of data, or can be streamed in real-time from the server 102, or both.

In some implementations, the client devices 150 and 160 are associated with a first organization, while the server 102 is associated with a second organization, with the client devices 150 and 160 communicating with the server 102 to consume data provided by the server 102. For example, in some cases, the first organization is a bank or other financial institution, while the second organization is a financial data reporting service, from which the first organization obtains trading data. The financial reporting service stores the trading data it generates on the server 102, which are made available to customers of the financial reporting service through network connections established using one or more APIs provided by the server. The client device 150 and/or the client device 160 run a trading platform to present trading data, including trading data that is stored in the server 102. The client devices 150 and 160 communicate with the server 102 using the APIs to obtain the trading data for presentation. The trading data presented can be in large volumes, for example, millions of records of data, or can be streamed in real-time from the server 102, or both. The client devices 150 and 160 can be used by the same user, or by different users.

In general, the system 100 allows the illustrated components to share and communicate information across devices and systems (for example, server 102 and client device 150 or client device 160, among others, through network 140). In some instances, the server 102 is a cloud-based component or system that is remotely connected to client devices, such as client devices 150 and 160, through public or private networks or a combination of the two. In some instances, the server 102 is a non-cloud-based component or system that is proximally connected to the client device 150 and/or client device 160, such as in an on-premise system configuration, a client-server application, applications running on one or more client devices, or combinations thereof. Although components are shown individually, in some implementations, functionality of two or more components, systems, or servers may be provided by a single component, system, or server.

As used in the present disclosure, the term "computer" is intended to encompass any suitable processing device. Server 102 and/or client devices 150 and 160 can be any computer or processing device such as, for example, a blade server, general-purpose personal computer (PC), Mac®, workstation, UNIX-based workstation, or any other suitable device. Moreover, although FIG. 1A illustrates a single server 102, the system 100 can be implemented using a plurality of servers, such as a server pool, as well as computers other than servers. In other words, the present disclosure contemplates computers other than general-purpose computers, as well as computers without conventional operating systems.

The client device 150 or the client device 160, or both, can be any system that can interact with the server 102, receive inputs from users, and display information using one or more GUIs, for example display trading data on a trading platform UI shown using a web browser on the respective client device. A client device can be a desktop computer, a laptop computer, a television with computer processing capabilities, a smart display device, or a mobile device, such as a smartphone, tablet, smartwatch, portable music player, electronic book reader, or any other suitable mobile computing device. In general, each illustrated component may be adapted to execute any suitable operating system, including Linux, UNIX, Windows, Mac OS®, Java™, Android™, Windows Phone OS, or iOS™, among others. A client device may include one or more specific applications executing on the client device, or the client device may include one or more web browsers or web applications that can interact with particular applications executing remotely from the client device, such as processes executed by the server 102. Moreover, although FIG. 1A illustrates two client devices 150 and 160, the system 100 can be implemented using a single client device (for example, one of client device 150 or client device 160), or more than the two client devices that are shown.

As illustrated, the server 102 includes or is associated with a network interface 104, processor(s) 106, and memory 110. The memory 110 includes instructions 112 that are executed by the processor(s) 106 to perform various operations. The memory 110 also stores data 114, which in some implementations are stored as data records, such as data records 116a and 116b. In some implementations, the data 114 includes financial trading data, such as prices of various securities, financial market news or events, among others. In some implementations, the data 114 includes real-time data, for example, fluctuations in prices of securities during a trading period. In some implementations, the data 114 includes streaming service data that are used by one or more entities associated with the system 100. For example, the data 114 can include financial services data that are used by market traders to make financial decisions. In some implementations, the server 102 obtains the data 114 from one or more streaming services to which the server 102 is connected through the network interface 104 and the network 140. In other implementations, the server 102 hosts one or more streaming services and stores the data for access by client devices that subscribe to the streaming services. In some implementations, the data 114 includes raw data, which correspond to data that has not been processed for presentation to a user on a client device, such as client device 150 and/or client device 160. In some implementations, all or some of the various types of data disclosed above are stored in the server 102 as raw data. The raw data is stored in some implementations as RTRE data. In some implementations, all or some of the various types of data disclosed above are stored in the server 102 as processed data.

The network interface 104 is used by the server 102 for communicating with other systems in a distributed environment—including within the system 100—connected to the network 140, for example, the client devices 150 and 160, and other systems communicably coupled to the server 102 and/or network 140. Generally, the network interface 104 comprises logic encoded in software and/or hardware in a suitable combination and operable to communicate with the network 140 and other components. More specifically, the network interface 104 may comprise software supporting one or more communication protocols associated with communications such that the network 140 and/or interface's hardware is operable to communicate physical signals within and outside of the illustrated system 100. Still further, the network interface 104 may allow the server 102 to communicate with the client device 150 and/or client device 160, and others, to obtain and/or provide information regarding trading platforms.

The network 140 facilitates wireless or wireline communications between the components of the system 100 (for example, between the server 102 and the client devices 150 and/or 160), as well as with any other local or remote computers, such as additional client devices, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 can facilitate communications between senders and recipients. In some instances, one or more of the illustrated components (for example, the server 102) may be included within or deployed to network 140 or a portion thereof as one or more cloud-based services or operations. In some instances, the network 140 is all or a portion of an enterprise or secured network, while in another instance, at least a portion of the network 140 represents a connection to the Internet. In some instances, a portion of the network 140 is a virtual private network (VPN). Further, all or a portion of the network 140 can comprise either a wireline or wireless link. Example wireless links may be based on Wi-Fi technologies such as 802.11a/b/g/n/ac/ax, or cellular technologies such as 2G, 3G, WiMAX, LTE, 5G, or 6G, and/or include any other appropriate wireless links. In other words, the network 140 encompasses any internal or external network, networks, sub-network, or combination thereof operable to facilitate communications between various computing components inside and outside the system 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

Although FIG. 1A shows that the server 102 includes a single processor 106, multiple processors may be used according to particular needs, desires, or particular implementations of the system 100. Each processor 106 may be a central processing unit (CPU), an application specific integrated circuit (ASIC), a field-programmable gate array (FPGA), or another suitable component. Each processor 106 may have a single or multiple cores, with each core available to host and execute an individual processing thread. Further, the number of, types of, and particular processors 106 used to execute the operations described herein may be dynamically determined based on a number of requests, interactions, and operations associated with the server 102.

Memory 110 may represent a single memory or multiple memories. The memory 110 may include any memory or database module and may take the form of volatile or non-volatile memory including, without limitation, magnetic media, optical media, random access memory (RAM), read-only memory (ROM), removable media, or any other suitable local or remote memory component. The memory 110 stores various objects or data, including instructions 112, data 114, and any other appropriate information associated with the server 102, including any parameters, variables, algorithms, instructions, rules, constraints, or references thereto. Additionally, the memory 110 may store any other appropriate data, such as VPN applications, firmware logs and policies, firewall policies, a security or access log, print or other reporting files, as well as others. While illustrated within the server 102, memory 110 or any portion thereof, including some or all of the particular illustrated components, may be located remote from the server 102 in some instances, including as a cloud application or repository, or as a separate cloud application or repository when the server 102 itself is a cloud-based system. In some instances, some or all of memory 110 may be located in, associated with, or available through one or more other systems of the associated organization.

The server 102 includes, among other components, several applications, entities, programs, agents, or other software or similar components capable of performing the operations described herein. Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. Each software component may be fully or partially written or described in any appropriate computer language including C, C++, JavaScript, Java™, Visual Basic, assembler, Python, Perl®, XML, any suitable version of 4GL, among others.

One or more client devices 150 and 160 are present in the system 100. Client devices 150 and 160 each includes, among other components, a network interface (respectively, network interfaces 152 and 162) for communication (similar to or different from network interface 104), and at least one processor (respectively, processors 154 and 164) (similar to or different from processor 106). Some client devices each includes a single display, for example, client device 150 has a single device display showing the GUI 156. Some other client devices each includes multiple displays. For example, client device 160 has two display monitors 161*a* and 161*b* that are each communicably coupled to the client device. Each of the display monitors 161*a* and 161*b* presents GUIs of applications executed by the client device 160, for example, GUIs 166 and 167, respectively. In some implementations, the GUIs displayed on the monitors 161*a* and 161*b* are for the same application. For example, GUIs 166 and 167 are GUIs of the trading platform running on the client device 160 in some implementations. In other implementations, the GUIs displayed on the monitors 161*a* and 161*b* are for different applications executed by the client device 160, where one of the applications is the trading platform. Although FIG. 1A shows two monitors 161*a* and 161*b* coupled to the client device 160, in some implementations, more than two monitors are coupled to a client device. Each of the monitors can concurrently present GUIs of the trading platform executed by the client device 160.

In some instances, each client device 150 and 160 includes an input device, such as a keypad, touch screen, or other input/output mechanisms that enable user interaction with one or more client applications, such as a trading platform front-end user interface displayed on any of the GUI 156, GUI 166, or GUI 167.

In some implementations, client device 150 or client device 160, or both, executes a trading platform, for example, by executing, using respective processor 154 and 164, instructions corresponding to the trading platform, to present data to user(s) of the client device. The data for the trading platform is presented using a GUI 156 on the display of the client device 150, or using one or more of the GUIs 166 and 167 displayed respectively on the monitors 161*a* and 161*b* coupled to the client device 160. In some implementations, the data is presented using one or more panels in the respective GUI, such as panels 158*a* and/or 158*b* in GUI 156, panels 168*a* and/or 168*b* in GUI 166, or panels 169*a* and/or 169*b* in GUI 167. Each of the panels can present trading data that has been processed for display on the respective GUI. Some or all of the trading data shown in the various panels can be same or different. Even if the underlying trading data is the same, the view of the data can be different among the panels, for example, the data can be presented in different formats in the different panels.

In some implementations, a GUI of the trading platform is presented using an instance of a web browser application executed by the corresponding client device. For example, in some cases, the GUI 156 is shown using an instance of Google Chrome™ web browser executed by client device 150. In other cases, the GUI 156 is shown using one of the web browsers Microsoft Edge™, Internet Explorer™, Apple Safari™, Mozilla Firefox™, Opera™, or another suitable web browser. In such implementations, the one or more panels 158*a* and 158*b* are presented using browser windows of the web browser instance executed by the client device 150.

In some cases, one or more panels are presented using different tabs within a single instance of a web browser application running on a client device. For example, the panels 158*a* and 158*b* can be presented using web browser tabs in a single window of Google Chrome™, or another suitable web browser, where a displayed web browser window corresponds to one running instance of the web browser in the client device 150.

In some cases, one or more panels are presented using different tabs within different instances of a web browser application running on a client device. For example, the panels 158*a* and 158*b* can be presented using discrete windows of instances of Google Chrome™ or another suitable web browser, that are executed by the client device 150. As another example, considering the client device 160, in some implementations, the GUIs 166 and 167 are presented on the monitors 161*a* and 161*b*, respectively, using different instances of a web browser, such as Google Chrome™, running on the client device 160. The panels 168*a* and 168*b* in the GUI 166, and the panels 169*a* and 169*b* in the GUI 167, correspond to the different running instances of the web browser.

In some cases, one or more panels are presented using instances of different web browser applications running on a client device. For example, panel 158*a* can be presented using a window of an instance of Google Chrome™ executed by the client device 150, while panel 158*b* can be presented on GUI 156 using a window of an instance of Microsoft Edge™, Internet Explorer™, Apple Safari™, Mozilla Firefox™, or Opera™ among other web browsers, executed by the client device 150. As another example, panels 168*a* and 168*b* can be presented on GUI 166 using a window of an instance of Google Chrom™ executed by the client device 160, while panels 169*a* and 169*b* can be presented on GUI 167 using a window of an instance of Microsoft Edge™, Internet Explorer™ Apple Safari™, Mozilla Firefox™, or Opera™, among other web browsers, executed by the client device 160. In some implementations, one or more of the panels displayed on a client device, for example, panels 158*a* and 158*b*, or panels 168*a*, 168*b*, 169*a* and 169*b*, correspond to different jobs in the trading platform, where a job is associated with the respective type of information to be processed, depending on the needs of the user (e.g., a trader). A trader can have multiple jobs, each shown on a different panel, for example, for different views of the trading data.

A trading platform as used in the system 100 is described in the following sections primarily with respect to the client device 150. However, the description is equally applicable to other client devices in the system 100, such as client device 160.

In some implementations, the panels 158*a* and/or 158*b* provide real-time visualization of trading data, such as price fluctuations of various securities as they are being traded in the financial markets. In some implementations, the trading platform subscribes to various data streams as requested by a user of the client device, and presents views of the data for the subscribed streams as the data is received at the client device 150. As described above, in some implementations, the trading platform uses one or more data worker threads executed within the browser application runtime environment to fetch the data for display. In some cases, the trading platform uses the data worker threads to fetch the data from the server 102, connected through the network interface 152 and the network 140.

In some implementations, input options are provided with the panels 158*a* and/or 158*b*, which allow a user to interact with the trading platform. For example, a user can provide an input requesting data analysis, or presentation in a particular format. The trading platform uses one or more crunch worker threads executed within the browser application runtime environment to process the data for display, for example, presenting the data in the requested format and/or presenting requested data analytics information.

FIG. 1B provides greater detail about data worker and crunch worker threads executed in the web browser runtime environment on the client device 150 that perform operations of the trading platform to present data on the GUI 156 in some implementations. As shown, and discussed above, in some implementations, the trading platform uses a web browser application 157 running on the client device 150 to present the trading data. When the trading platform is executed on the client device 150, and the corresponding GUI 156 is launched using the browser 157, one or more data worker threads 159*a* and one or more crunch worker threads 159*b* are launched as in the backend processes 159 of the browser 157, executed within the runtime environment of the browser.

In some implementations, for every panel that is shown in the GUI 156, at least one dedicated data worker thread and/or at least one dedicated crunch worker thread is launched. For example, in such implementations, the trading platform executes a data worker thread 159*a* and a crunch worker thread 159*b* to obtain and present data for the panel 158*a*, and further executes a different data worker thread 159*a* and a different crunch worker thread 159*b* to obtain and present data for the panel 158*b*. The dedicated data worker threads fetch data for the respective panels, and the dedicated crunch worker threads process and prepare the data for a view specific to the respective panel.

In some implementations, one or more data worker threads are shared among multiple panels shown in the GUI 156, while each panel has at least one dedicated crunch worker thread. For example, in such implementations, the trading platform executes a data worker thread 159*a* and a crunch worker thread 159*b* to obtain and present data for the panel 158*a*. However, the trading platform executes different crunch worker threads 159*b* to obtain and present data for the panel 158*b*. The common data worker thread fetches data for both panels, while the dedicated crunch worker threads process and prepare the data for presentation specific to the respective panel.

In some implementations, one or more crunch worker threads are shared among multiple panels shown in the GUI 156, while each panel has at least one dedicated data worker thread. For example, in such implementations, the trading platform executes different data worker threads 159*a* for the panels 158*a* and 158*b*, while both panels share a common crunch worker thread 159*b*. The different data worker threads fetch data for their respective panels, while the common crunch worker thread processes and prepares the data for presentation for both panels.

To describe the functionalities of a data worker thread 159*a* and a crunch worker thread 159*b*, in one illustrative implementation, the data worker thread 159*a* fetches data from a server for display on the GUI 156 (for example, using one or more of the panels 158*a* and 158*b*), and maintains real-time or non-real-time data subscriptions. For example, the data worker thread 159*a* fetches raw data, such as one or more records 116*a* and 116*b*, from the server 102 over the network 140. In some implementations, the data worker thread 159*a* subscribes to several streams of data and events made available by the server 102, using a streaming API, for example, a GraphQL subscription API. In some implementations, the raw data fetched by the data worker thread 159*a* is raw RTRE data, which can include, for example, one or more JavaScript Object Notation (JSON) values and corresponding RTRE keys.

The data worker thread 159*a* stores the fetched data as raw data 155*a* in the local storage of the client device 150, for example, datastore 155. In some implementations, the raw data 155*a* includes raw RTRE keys and corresponding data (for example, JSON values).

In some implementations, the datastore 155 includes an IndexedDB database. Although FIG. 1B shows a single IndexedDB database with respect to the datastore 155, the client device 150 can include multiple such IndexedDB databases in one or more datastores.

In this context, IndexedDB is a transactional database storage system providing a low-level API that facilitates storing large volumes of data in the browser of a client device, for example, browser 157 running on client device 150. The IndexedDB API uses indexes to enable high-performance searches of the stored data. The IndexedDB database is a JavaScript-based object-oriented database that enables storage and retrieval of objects that are indexed with a key. A database schema is specified to work with IndexedDB database. Data can be retrieved and updated within a series of transactions after opening a connection to the database.

In some implementations, the IndexedDB database stores key-value pairs, where the values can be complex structured objects, and the keys can be properties of those objects. For example, the raw data 155a is stored as <RTRE key, JSON value> in some implementations. In some implementations, the IndexedDB database enables use of indexes with any property of the objects for quick searching, as well as sorted enumeration. The keys can be binary objects.

In some implementations, the IndexedDB database realized by the datastore 155 includes object stores acting as buckets for the data, such as raw data 155a or crunched data 155b, enabling the data to persist across different runtime instances of the browser. An object store in an IndexedDB database, which is an individual bucket to store data, is analogous to tables in traditional relational databases. In some implementations, there is one object store for each high-level type of data that is stored in the datastore 155. For example, there can be two object stores—one for the raw data 155a, and another for the crunched data 155b. Within each object store, data of multiple different types can be stored. For example, the raw data 155a can include RTRE data and non-RTRE raw data, while the crunched data 155b can include processed data in multiple different formats, and/or analytics reports. An index is a type of object store for organizing data in another object store (called the reference object store) by an individual property of the data. Indexes are made when object stores are created and can also be used to define a unique constraint on the data. An index uses the individual property as its key path instead of the reference store's primary key. The index is used to retrieve records in the object store by this property. For example, if the crunched data 155b includes data in different presentation formats, some of the data can be fetched for view using a particular presentation format.

Operations performed using IndexedDB are done asynchronously, so as not to block applications. IndexedDB supports browser search, get, and put actions, and transactions, which can be performed using web worker threads. All data operations in IndexedDB (for example, an interaction with the database by a web worker thread) are carried out inside a transaction. Each operation has this form: (1) Get database object; (2) Open transaction on database; (3) Open object store on transaction; (4) Perform operation on object store. A transaction, in this context, is a wrapper around an operation or group of operations, that ensures integrity of the IndexedDB database. If one of the operations within a transaction fails, none of the operations are applied and the database returns to the state it was in before the transaction began (e.g., all of the actions are rolled back). For example, all read or write operations in IndexedDB are part of a transaction. This allows for atomic read modify write operations by web worker threads, such that other web worker threads do not use intermediate forms of the data in concurrent operations.

As shown in FIG. 1B, the data worker thread 159a uses store routines 153a to write the received data to the datastore 155 as raw data 155a. In implementations realizing an IndexedDB database corresponding to the datastore 155, the store routines 153a are part of a suite of IndexedDB (IDB) software library routines that access the datastore using the IDB API calls associated with the IndexedDB database. The following sections describe the datastore 155 as an IndexedDB database 155, and the processes to access data in the datastore 155, for example, store routines 153a and 153c, and fetch routines 153b, as being part of a suite of DB library routines. However, in some implementations, the datastore 155 can also be a storage system different from an IndexedDB database, and the store routines 153a and 153c, or fetch routines 153b, as being software processes different from IDB library routines.

Continuing with the description of implementations in which the datastore 155 is an IndexedDB database, the data worker thread 159a uses the IDB library routines to store the raw data 155a, for example, raw RTRE keys and corresponding JSON values, in the IndexedDB database 155. The IDB library routines make low-level IndexedDB API calls to access the data from the database, and are used to manage the frequency of database calls (e.g., data throttling), and queuing data for processing, among others.

In some implementations, the IDB library routines are promise-driven library routines, for example, in which the operational flow depends on when tasks are completed. In such implementations, the IDB promise-driven library translates database requests into promises. A promise, in this context, represents the result of an asynchronous database operation. A promise can be in one of three different states: pending, which is the initial state of a promise; fulfilled, which is the state of a promise representing a successful operation; or rejected, which is the state of a promise representing a failed operation. Once a promise is fulfilled or rejected, it is immutable. The IDB promise-driven library routines facilitate error handling, and avoid callback parameters, without modifying the underlying architecture. For example, in some implementations, IDB promise-driven library routines are implemented in JavaScript and used to wrap asynchronous operations.

In some implementations, after the data worker thread stores the raw data 155a in the datastore 155, the IDB library routines trigger the crunch worker thread 159b to process the raw data 155a. The crunch worker thread 159b accesses the raw data 155a from the datastore 155 using fetch routines 153b, which are a part of the suite of IDB library routines for the IndexedDB database, as noted above. The crunch worker thread 159b processes the raw data for presentation on the GUI 156. The processing can include, for example, preparing the data in a format requested for presentation on a panel, for example, one of panels 158a and 158b; performing aggregations and computations on the data corresponding to a job requested by a user of the trading platform; or analyzing the raw data and preparing analytics reports for presentation on a panel, for example, one of panels 158a and 158b, among other suitable functions. In some implementations, the crunch worker thread 159b performs complex event processing on rapidly changing raw data 155a that is provided by the data worker thread 159a, for example, real-time streaming equities and derivatives data.

Following processing of the raw data, the crunch worker thread 159b stores the processed data in the datastore 155 as crunched data 155b, using store routines 153c to access the IndexedDB database. As noted above, the store routines 153c are a part of the suite of IDB library routines for the IndexedDB database. In some implementations, the store routines 153c are similar to the store routines 153a. In other implementations, the store routines 153c are distinct from the store routines 153a.

Additionally or alternatively to storing the crunched data 155b, in some implementations, the crunch worker thread 159b sends the crunched data for display, for example, to the GUI 156. Upon receiving the processed data from the crunch worker thread 159b, the GUI 156 refreshes the displayed information, for example, by updating the data presented on one or more of the panels 158a or 158b.

In some implementations, the trading platform executes multiple instances of data worker threads 159a or crunch worker threads 159b, or both. For example, in some cases, a user can subscribe to a large number of data streams, such that the demand for streaming data increases beyond the processing capability of an individual data worker thread. In such cases, the trading platform can spawn one or more additional data worker threads, and distribute the load to fetch and store data among the different data worker threads. Additionally or alternatively, in some cases, the user can request ad hoc reports on a large number of parameters or metrics related to the raw data, such that the demand for ad hoc analytics is higher than the processing capability of one individual crunch worker thread that is in service. In such cases, the trading platform can spawn one or more additional crunch worker threads, and distribute the data processing load among the different crunch worker threads.

In some implementations, a user or users can use multiple web browser windows to access the trading platform running on a client device, where the number of instances are limited by the hardware capabilities of the client device. For example, a first user can access the trading platform running on client device 160 using the GUI 166 on monitor 161a, while a second user can access the trading platform running on client device 160 using the GUI 167 on monitor 161b. As each user accesses the trading platform using a web browser (or tabs within a web browser), one or more crunch worker threads, or data worker threads, or both, are spawned to service the jobs presented on the browser (or tab) windows. In some implementations, the trading platform performs load balancing among the different crunch worker threads or data worker threads, or both, across the different web browser windows, for example, by spreading out the backend processing tasks among the plurality of crunch worker threads that are spawned for the different windows. In this manner, with more browser windows of the trading platform running on a client device, for example, due to more users accessing the trading platform on the client device, more resources (e.g., web worker threads) are made available to spread out the trading platform tasks in the runtime environment of the web browser, such that the processing load of the trading platform is decentralized through the users. Such implementations can improve scalability of the trading platform.

While portions of the elements illustrated in FIGS. 1A and 1B are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
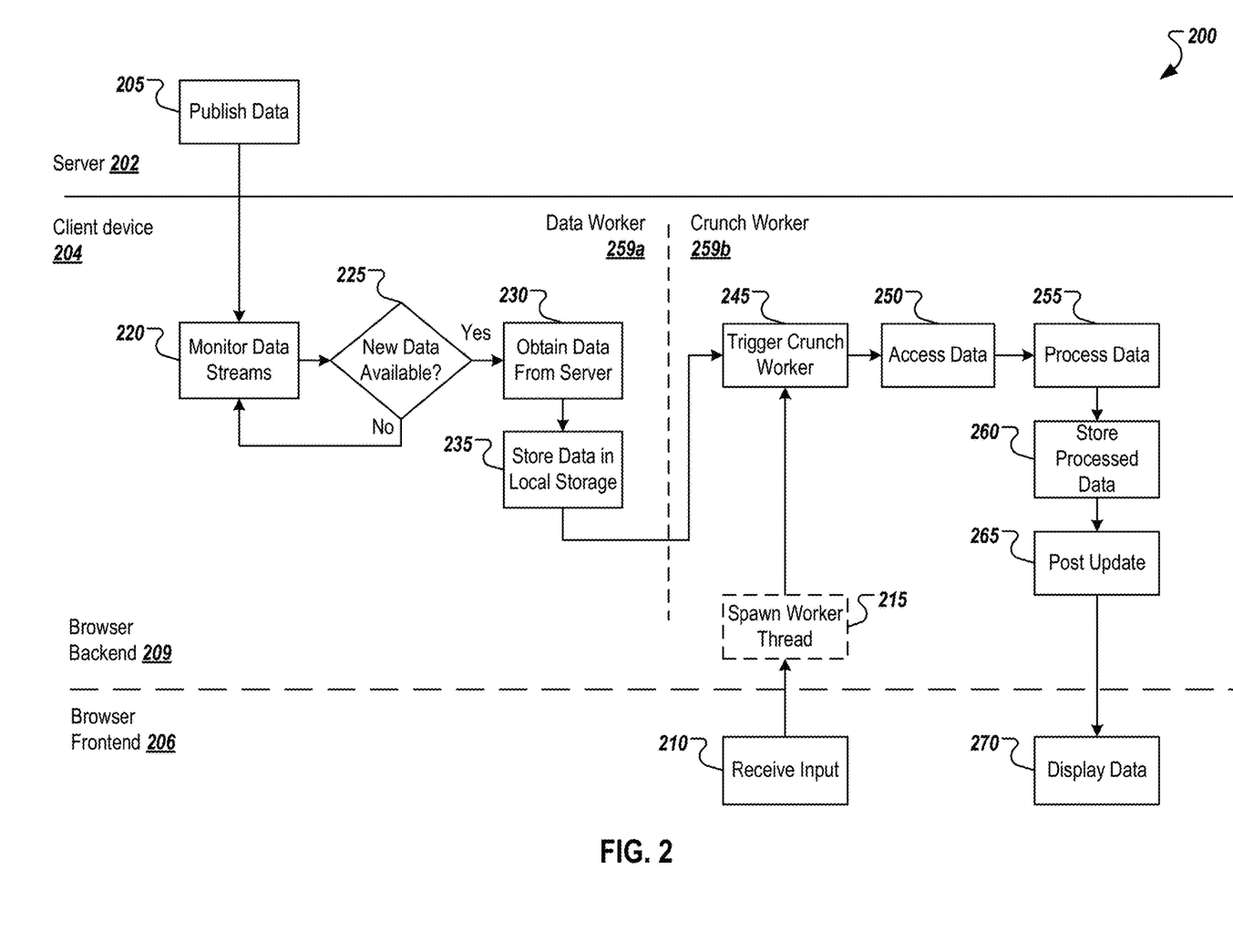
FIG. 2 is a flow diagram that illustrates an example of operational flows of a data worker thread and a crunch worker thread.

FIG. 2 is a flow diagram 200 that illustrates an example of operational flows of a data worker thread 259a and a crunch worker thread 259b. The data worker thread 259a and crunch worker thread 259b are executed in a browser backend processing environment 209, and corresponding interactions with the browser frontend 206, of a client device 204, to fetch raw data for a trading platform from a server 202 and process the fetched data for presentation on a GUI of the trading platform.

In some implementations, the server 202 and the client device 204 are respectively similar to the server 102 and the client device 150 discussed with respect to the system 100. In such implementations, the browser backend 209 and the browser frontend 206 are respectively similar to the backend 159 and the GUI 156 of the browser 157; and the data worker thread 259a is an instance of the data worker thread 159a, while the crunch worker thread is an instance of the crunch worker thread 159b.

As shown in FIG. 2, data for consumption by a trading platform is published by the server 202 (205). For example, as described previously, the server can act as a repository of raw trading data that is provided by various remote data providers. An input is received through the browser frontend 206 on the client device 204 (210). For example, a user can provide an input to launch the trading platform, with the GUI of the trading platform being displayed using a browser window on the client device 204. As another example, a user can provide an input to start a new job on a running instance of the trading platform, by opening a new panel (e.g., tab) in a browser window for a new view of data of the trading platform, or to access new trading data, such as upon subscribing to a new data stream. In such cases, the trading platform spawns one or more worker threads (215). For example, the trading platform can spawn one or more data worker threads or one or more crunch worker threads, or both. In some cases, a user can provide an input to change the view for an existing job, for example, to refresh the displayed data. In such cases, new web worker threads may not be spawned, but an existing crunch worker thread can be triggered (245) to perform new tasks, as described below.

When the trading platform is running on the client device 204 with at least one data worker thread 259a and one crunch worker thread 259b corresponding to the trading platform executed in the browser backend 209, the data worker thread 259a monitors data streams for the trading platform (220). For example, when the input is an initial launch of the trading platform in some implementations, the data worker thread 259a determines new data subscriptions or existing data subscriptions (for example, from a previous session of the trading platform) for the trading platform upon launch. In cases where the trading platform is already running, with a data worker thread 259a being executed in the backend 209, when the input (210) is to access new trading data, the data worker thread determines a new data subscription corresponding to the new data access request. After determining the streaming data subscriptions, the data worker thread subscribes to the data streams and monitors the data streams. For example, the data worker thread 259a connects to the server 202 and subscribes to one or more streams of interest made available by the server, for example, using a streaming API, such as a GraphQL subscription API. The data worker thread periodically queries the server 102 to determine if new data is available at the server for the one or more streaming data services that the data worker thread 159a has subscribed to. If the data worker thread determines that there is new data available (225), for example, upon an indication from the server 102, then the data worker thread obtains the data from the server 102 (230) and stores the data in local storage (235). For example, when there is new data available at the server, such as one more new data records 116a or 116b, the data worker thread 259a obtains the data from the server and stores the data in datastore 155. As described previously, in some implementations, the data in the server as raw RTRE data, which is stored as raw RTRE data 155a in the IndexedDB database in the datastore 155. The data worker thread 259a uses store routines 153a, which are IDB library routines as discussed above in the described implementations, to write the raw data 155a to the IndexedDB database in the datastore 155. In some implementations, the data worker thread pulls the new data from the server, while in other implementations, the server pushes the new data to the client device, for reception by the data worker thread.

As described previously, after the data worker thread 259a obtains the new data from the server and stores in the local storage, the crunch worker thread 259b is triggered (245) to process the data. For example, the IDB library routines trigger the crunch worker thread 259b after the data worker thread 259a uses the IDB library routines to store the raw data 155a in the IndexedDB database.

As noted above, in some implementations, a crunch worker thread is triggered to process raw data stored in the datastore 155 upon receiving a user input (210). For example, a user of the client device may provide an input through the GUI, requesting ad hoc analytics. Upon receiving the input, the crunch worker thread 259b is triggered to process the corresponding data, and generate the requested analytics information.

Following the trigger, the crunch worker thread 259b accesses the data (250) for processing. For example, the crunch worker thread 259b accesses the raw data 155a from the IndexedDB database using IDB library fetch routines 153b.

Upon accessing the data, the crunch worker thread processes the data (255). For example, in some implementations, crunch worker thread 259b processes the raw data 155a to be presented in a particular format that is specified for the panel serviced by the crunch worker thread. In some cases, crunch worker thread 259b performs complex processing on the raw data 155a, such as analytics operations.

Once the raw data is processed and prepared for presentation, the crunch worker thread 259b stores the processed data in local storage (260). For example, the crunch worker thread 159b stores the crunched data 155b in the IndexedDB database using IDB library store routines 153c.

In some implementations, the crunch worker thread posts an update to the trading platform GUI (265). For example, the crunch worker thread 259b forwards the processed data to the browser frontend 206 for displaying (270) the processed data using the corresponding GUI or view of the trading platform serviced by the thread, such as one of panels 158a or 158b. In some implementations, sending the data to the frontend for display is performed concurrently with storage of crunched data in the local storage.

Figure 3:
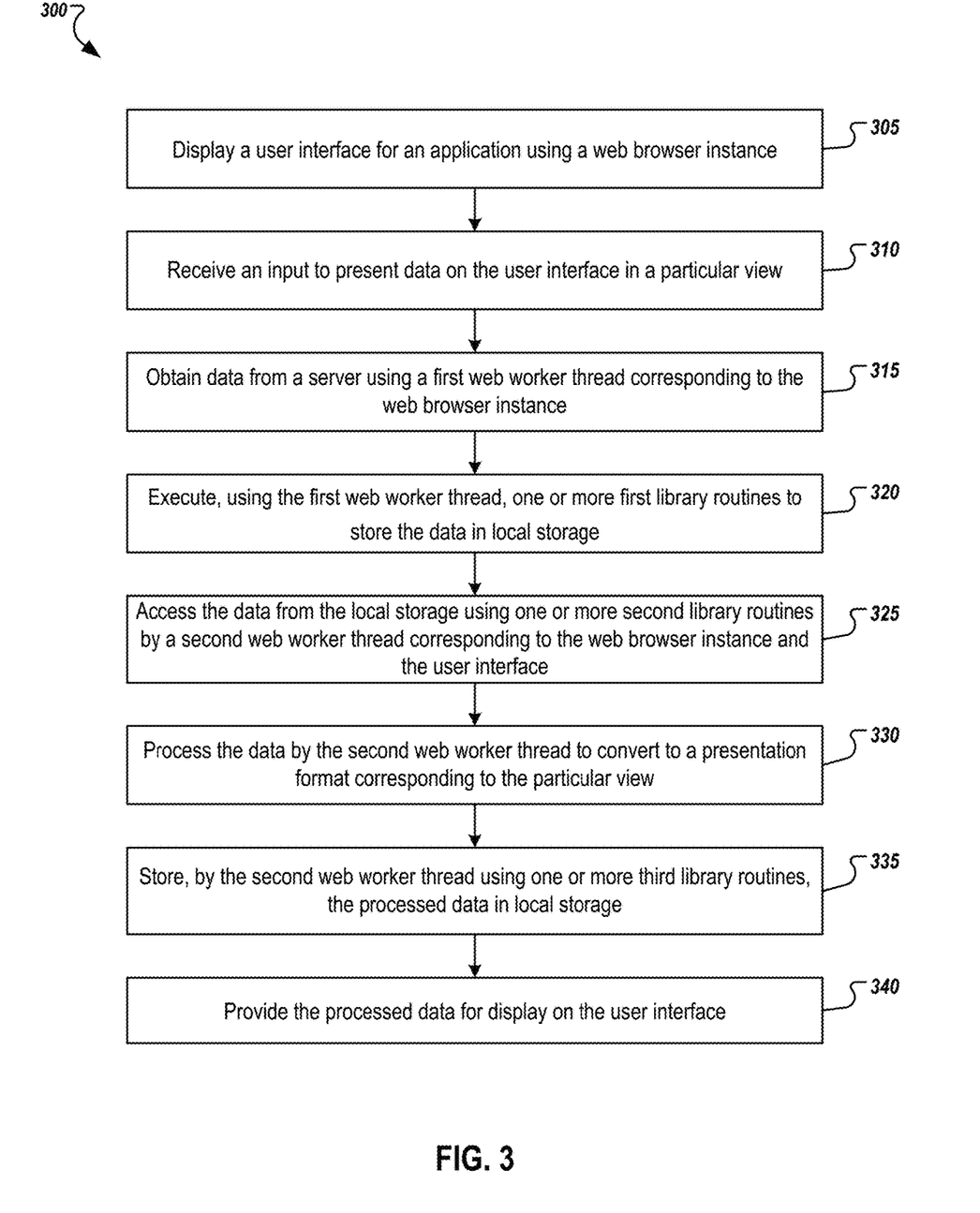
FIG. 3 is a flow chart diagram of an example method for browser-based data rendering for applications in one example implementation.

FIG. 3 is a flow chart diagram of an example method 300 for browser-based data rendering for applications in one example implementation. For clarity of presentation, the description that follows generally describes method 300 in the context of the system 100 illustrated in FIGS. 1A and 1B. However, it will be understood that method 300 may be performed, for example, by any other suitable system, environment, software, and hardware, or a combination of systems, environments, software, and hardware as appropriate. In some instances, method 300 can be performed by the server 102 and/or the client device 150 or the client device 160, or portions thereof, described in FIGS. 1A and 1B, as well as other components or functionality described in other portions of this description.

The method 300 starts by displaying a user interface for an application using a web browser instance (305). For example, in some implementations, the processor 154 of the client device 150 receives an input through an input/output interface of the client device to run the trading platform on the client device. Upon receiving the input, the processor 154 executes instructions to launch the trading platform, including presenting GUI 156 corresponding to the trading platform using a window (or a tab in a window) of the browser 157.

The method 300 continues by receiving an input to present data on the user interface in a particular view (310). For example, the trading platform (that is, instructions corresponding to the trading platform that are executed by the processor 154) running on the client device 150 determines reception of an input, through an input option provided using the GUI 156, to present new trading data (e.g., subscribing to a new data stream), or a different view of the trading data (e.g., to present ad hoc analytics) on the GUI 156 (or one of the panels 158a or 158b).

The method 300 continues by obtaining data from a server using a first web worker thread corresponding the web browser instance (315). For example, when the trading platform is launched and a GUI 156 corresponding to the trading platform is displayed using the browser 157, the trading platform executes a data worker thread, such as data worker thread 159a, in the background within the runtime environment of the web browser 157. The data worker thread 159a communicates with the server 102 over the network 140, and subscribes to one or more streaming services from which trading data is obtained to display on the GUI 156. The data worker thread 159a monitors the availability of new data on the server 102; when new data is available, for example, one or more records 116a or 116b, the data worker thread 159a obtains the data from the server 102, as described in the previous sections.

The method 300 continues by executing, using the first web worker thread, one or more first library routines to store the data in local storage (320). For example, in some implementations, the datastore 155 in the client device 150 implements an IndexedDB database. The data worker thread 159a obtains raw RTRE data (e.g., RTRE keys and corresponding JSON values) from the server 102, and uses store routines 153a that are part of the IDB library for interfacing with the IndexedDB database, to store the raw RTRE data in the IndexedDB database as raw data 155a.

The method 300 continues by accessing the data from the local storage using one or more second library routines by a second web worker thread corresponding to the web browser instance and the user interface (325). For example, the trading platform executes one or more crunch worker threads, such as crunch worker thread 159b, in the background within the runtime environment of the web browser 157, and uses the crunch worker threads to process the trading data obtained from the server 102. In some implementations, after the data worker thread 159a stores the raw RTRE data in the IndexedDB database as raw data 155a using the IDB library store routines 153a, the IDB library routines trigger the crunch worker thread 159b to process the new raw data 155a. Upon being triggered, the crunch worker thread 159b accesses the raw data 155a from the IndexedDB database in the datastore 500 using the fetch routines 153b that are part of the IDB library.

The method 300 continues by processing the data by the second web worker thread to convert to a presentation format corresponding to the particular view (330). For example, the crunch worker thread 159b processes the raw data 155a for presentation on the GUI 156 (or one of the panels 158a or 158b in the GUI 156). As described previously, the processing can include one or more of updating the presentation format of the raw data to a usable format for the view specific to the GUI or panel serviced by the crunch worker thread 159a; performing aggregation and computations, analytics operations or other complex event processing, on the raw data; or any other suitable operation performed by the trading platform for presenting trading data on the GUI 156.

The method 300 continues by storing, by the second web worker thread using one or more third library routines, the processed data in local storage (335). For example, the crunch worker thread 159*b* uses store routines 153*c*, which are part of the suite of IDB library routines for the IndexedDB database in the datastore 155, to store the processed data as crunched data 155*b* in the IndexedDB database.

The method 300 continues by providing the processed data for display on the user interface (340). For example, in addition to storing the crunched data 155*b* in the datastore 155, the crunch worker thread 159*b* sends the crunched data to the GUI 156 for presentation on the display of the client device 150, using a view of the trading platform shown on one of the panels 158*a* or 158*b* that is serviced by the crunch worker thread 159*b*.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
    displaying, using a plurality of web browser instances on a client device, a plurality of application interfaces;
    obtaining, using a first web worker thread, data from a server for display using the plurality of application interfaces;
    storing, using the first web worker thread, the obtained data using a particular database format in storage coupled to the client device, the storing comprising executing, using the first web worker thread, one or more first library routines corresponding to the particular database format to store the data in the storage using the particular database format;
    accessing, by a second web worker thread and a third web worker thread, the data from the storage, wherein the first web worker thread, the second web worker thread and the third web worker thread are different from one another;
    converting, by the second web worker thread, at least a portion of the data to a first presentation format for display using a first application interface of the plurality of application interfaces; and
    converting, by the third web worker thread, at least a portion of the data to a second presentation format for display using a second application interface of the plurality of application interfaces, the second presentation format being different than the first presentation format.

2. The method of claim 1, wherein accessing the data from the storage by the second web worker thread and the third web worker thread comprises:
    executing, by at least one of the second web worker thread or the third web worker thread, one or more second library routines corresponding to the particular database format to access the data stored in the storage using the particular database format.

3. The method of claim 2, further comprising:
    storing, in the storage using the particular database format and by at least one of the second web worker thread or the third web worker thread, at least one of the data converted to the first presentation format or the second presentation format, the storing comprising executing, by at least one of the second web worker thread or the third web worker thread, one or more third library routines corresponding to the particular database format.

4. The method of claim 1, wherein the particular database format includes an IndexedDB datastore, and wherein the first library routines correspond to IndexedDB Promised Library routines.

5. The method of claim 1, wherein the data obtained from the server includes Real-time Rendering Engine (RTRE) data and the portion of the data converted by the second web worker thread includes crunched data, and wherein converting the portion of the data by the second web worker thread comprises:
    aggregating, using the second web worker thread, the RTRE data accessed from the storage to a crunched presentation format for display using the first application interface.

6. The method of claim 1, wherein the plurality of web browser instances are instances of a same web browser executed on the client device, and
    wherein displaying the plurality of application interfaces comprises displaying at least the first application interface and the second application interface concurrently.

7. The method of claim 1, further comprising:
    obtaining, from the server using the first web worker thread, first additional data for display using the first application interface and second additional data for display using the second application interface, wherein at least a portion of the second additional data is distinct from the first additional data;
    storing, using the first web worker thread, the first additional data and the second additional data in the storage; and
    causing at least one of the second web worker thread to access the first additional data from the storage for processing, or the third web worker thread to access the second additional data from the storage for processing.

8. One or more non-transitory computer-readable media storing instructions that, when executed, cause one or more processors to perform operations comprising:
    displaying, using a plurality of web browser instances on a client device, a plurality of application interfaces;
    obtaining, using a first web worker thread, data from a server for display using the plurality of application interfaces;

storing, using the first web worker thread, the obtained data using a particular database format in storage coupled to the client device, the storing comprising executing, using the first web worker thread, one or more first library routines corresponding to the particular database format to store the data in the storage using the particular database format;

accessing, by a second web worker thread and a third web worker thread, the data from the storage, wherein the first web worker thread, the second web worker thread and the third web worker thread are different from one another;

converting, by the second web worker thread, at least a portion of the data to a first presentation format for display using a first application interface of the plurality of application interfaces; and converting, by the third web worker thread, at least a portion of the data to a second presentation format for display using a second application interface of the plurality of application interfaces, the second presentation format being different than the first presentation format.

9. The one or more non-transitory computer-readable media of claim 8, wherein accessing the data from the storage by the second web worker thread and the third web worker thread comprises:

executing, by at least one of the second web worker thread or the third web worker thread, one or more second library routines corresponding to the particular database format to access the data stored in the storage using the particular database format.

10. The one or more non-transitory computer-readable media of claim 9, the operations further comprising:

storing, in the storage using the particular database format and by at least one of the second web worker thread or the third web worker thread, at least one of the data converted to the first presentation format or the second presentation format, the storing comprising executing, by at least one of the second web worker thread or the third web worker thread, one or more third library routines corresponding to the particular database format.

11. The one or more non-transitory computer-readable media of claim 8, wherein the particular database format includes an IndexedDB datastore, and wherein the first library routines correspond to IndexedDB Promised Library routines.

12. The one or more non-transitory computer-readable media of claim 8, wherein the data obtained from the server includes Real-time Rendering Engine (RTRE) data and the portion of the data converted by the second web worker thread includes crunched data, and wherein converting the portion of the data by the second web worker thread comprises:

aggregating, using the second web worker thread, the RTRE data accessed from the storage to a crunched presentation format for display using the first application interface.

13. The one or more non-transitory computer-readable media of claim 8, wherein the plurality of web browser instances are instances of a same web browser executed on the client device, and wherein displaying the plurality of application interfaces comprises displaying at least the first application interface and the second application interface concurrently.

14. The one or more non-transitory computer-readable media of claim 8, the operations further comprising:

obtaining, from the server using the first web worker thread, first additional data for display using the first application interface and second additional data for display using the second application interface, wherein at least a portion of the second additional data is distinct from the first additional data;

storing, using the first web worker thread, the first additional data and the second additional data in the storage; and causing at least one of the second web worker thread to access the first additional data from the storage for processing, or the third web worker thread to access the second additional data from the storage for processing.

15. A system comprising:

one or more processors; and one or more computer-readable media storing instructions that, when executed, cause the one or more processors to perform operations comprising:

displaying, using a plurality of web browser instances on a client device, a plurality of application interfaces;

obtaining, using a first web worker thread, data from a server for display using the plurality of application interfaces;

storing, using the first web worker thread, the obtained data using a particular database format in storage coupled to the client device, the storing comprising executing, using the first web worker thread, one or more first library routines corresponding to the particular database format to store the data in the storage using the particular database format;

accessing, by a second web worker thread and a third web worker thread, the data from the storage, wherein the first web worker thread, the second web worker thread and the third web worker thread are different from one another;

converting, by the second web worker thread, at least a portion of the data to a first presentation format for display using a first application interface of the plurality of application interfaces; and converting, by the third web worker thread, at least a portion of the data to a second presentation format for display using a second application interface of the plurality of application interfaces, the second presentation format being different than the first presentation format.

16. The system of claim 15, wherein accessing the data from the storage by the second web worker thread and the third web worker thread comprises:

executing, by at least one of the second web worker thread or the third web worker thread, one or more second library routines corresponding to the particular database format to access the data stored in the storage using the particular database format.

17. The system of claim 16, the operations further comprising:

storing, in the storage using the particular database format and by at least one of the second web worker thread or the third web worker thread, at least one of the data converted to the first presentation format or the second presentation format, the storing comprising executing, by at least one of the second web worker thread or the third web worker thread, one or more third library routines corresponding to the particular database format.

18. The system of claim 15, wherein the particular database format includes an IndexedDB datastore, and wherein the first library routines correspond to IndexedDB Promised Library routines.

19. The system of claim 15, wherein the data obtained from the server includes Real-time Rendering Engine (RTRE) data and the portion of the data converted by the second web worker thread includes crunched data, and wherein converting the portion of the data by the second web worker thread comprises:

aggregating, using the second web worker thread, the RTRE data accessed from the storage to a crunched presentation format for display using the first application interface.

20. The system of claim 15, wherein the plurality of web browser instances are instances of a same web browser executed on the client device, and wherein displaying the plurality of application interfaces comprises displaying at least the first application interface and the second application interface concurrently.

21. The system of claim 15, the operations further comprising:

obtaining, from the server using the first web worker thread, first additional data for display using the first application interface and second additional data for display using the second application interface, wherein at least a portion of the second additional data is distinct from the first additional data;

storing, using the first web worker thread, the first additional data and the second additional data in the storage; and causing at least one of the second web worker thread to access the first additional data from the storage for processing, or the third web worker thread to access the second additional data from the storage for processing.

* * * * *

UNITED STATES PATENT AND TRADEMARK OFFICE
CERTIFICATE OF CORRECTION

| | | |
|---|---|---|
| PATENT NO. | : 11,922,214 B2 | |
| APPLICATION NO. | : 17/659210 | |
| DATED | : March 5, 2024 | |
| INVENTOR(S) | : Walter Osmond, Osama Syed Hashimi and Ivan Shibanov | |

It is certified that error appears in the above-identified patent and that said Letters Patent is hereby corrected as shown below:

On the Title Page

Item (73), under Assignee, Line 1, delete "Bank" and insert -- Bank, Toronto (CA) --.

In the Specification

In Column 1, Line 6, delete "2022," and insert -- 2020, --.

In Column 1, Line 7, after "herein" insert -- . --.

Signed and Sealed this
Twenty-third Day of April, 2024

Katherine Kelly Vidal
*Director of the United States Patent and Trademark Office*